United States Patent [19]

Shapess

[11] Patent Number: 4,489,568
[45] Date of Patent: Dec. 25, 1984

[54] GROUND WATER HEAT PUMP SYSTEM

[75] Inventor: Robert P. Shapess, Cato, N.Y.

[73] Assignee: Snyder General Corporation, Dallas, Tex.

[21] Appl. No.: 599,601

[22] Filed: Apr. 13, 1984

Related U.S. Application Data

[63] Continuation of Ser. No. 345,294, Feb. 3, 1982.

[51] Int. Cl.³ ............................................. F25B 13/00
[52] U.S. Cl. .................................... 62/324.1; 62/260; 62/238.6; 237/2 B; 165/45
[58] Field of Search ................. 62/238.6, 324.4, 324.1, 62/260; 237/2 B; 165/29, 45

[56] References Cited

U.S. PATENT DOCUMENTS

| | | |
|---|---|---|
| 2,167,878 | 8/1939 | Crawford . |
| 2,266,238 | 12/1941 | Newton .............................. 62/238.6 |
| 2,438,720 | 3/1948 | Smith . |
| 2,461,449 | 2/1949 | Smith et al. . |
| 2,503,456 | 4/1950 | Smith . |
| 2,513,373 | 7/1950 | Sporn et al. . |
| 2,572,356 | 10/1951 | Krueger . |
| 2,860,493 | 11/1958 | Capps et al. . |
| 4,006,857 | 2/1977 | Adrian . |
| 4,215,551 | 8/1980 | Jones ...................................... 62/260 |
| 4,255,936 | 3/1981 | Cochran . |
| 4,293,093 | 10/1981 | Raymond et al. .................. 62/238.6 |

OTHER PUBLICATIONS

Popolar Science, "Ground Water Heat Pumps" Feb. 1978 p. 81

*Primary Examiner*—Henry Bennett
*Attorney, Agent, or Firm*—Hubbard, Thurman, Turner & Tucker

[57] ABSTRACT

A ground water system for a domestic storage tank and reversible heat pump is arranged to prevent the build up of excessive pressure in the storage tank when the flow of water through the heat pump is restricted to a defined degree by the operation of valve means controlling the water flow as required by the heat pump.

7 Claims, 2 Drawing Figures

GROUND WATER HEAT PUMP SYSTEM

This application is a continuation of application Ser. No. 345,294 filed Feb. 3, 1982.

DESCRIPTION

BACKGROUND OF THE INVENTION

1. Field of the Invention

The invention relates to reversible heat pump systems in which water for heat transfer purposes is obtained from a ground well.

2. Description of the Prior Art

It is well known to use ground water from a well to add heat to the refrigerant of a reversible heat pump when operated in a heating mode and to subtract heat from the refrigerant when the pump is operated in a cooling mode. Further, it is known in reversible heat pump systems to provide valve means permitting a high rate of flow of water through the heat pump when functioning in a heating mode and a substantially lesser flow when the heat pump is operated in a cooling mode, the change in the flow rate of water being required to assure proper operation of the heat pump.

It is a prime object of the present invention to provide an improved ground water supply system wherein an excessive pressure build up in a supply line extending to a reversible heat pump is prevented when valve means operates to restrict the flow of water through the heat pump.

It is another object of the invention to provide a ground water supply system wherein water from a well is delivered through a supply line to both a domestic storage tank and a reversible heat pump, and wherein an excessive pressure build up in the tank is prevented when valve means operates to restrict the flow of water through the heat pump.

Other objects and advantages of the invention will become apparent during a reading of the specification taken in connection with the accompanying drawings.

SUMMARY OF THE INVENTION

A ground water heat pump supply system in accordance with the invention includes a well which serves as a water source, a supply line through which water is delivered to a reversible heat pump, valve means for restricting the flow of water through the heat pump as when operated in a cooling mode, and a discharge line on the supply side of the heat pump including pressure relief means permitting water to escape from the supply line when pressure therein is increased beyond a predetermined level by the said valve means being operated to restrict flow through the heat pump. The well, in addition to supplying water for the heat pump for heat transfer purposes, supplies water to a domestic water storage tank connected to the pump supply line. Excessive tank pressure due to restricted flow through the heat pump is prevented by the flow of water through the aforesaid discharge line as permitted by the pressure relief means.

DESCRIPTION OF THE PREFERRED EMBODIMENT

Figure 1:
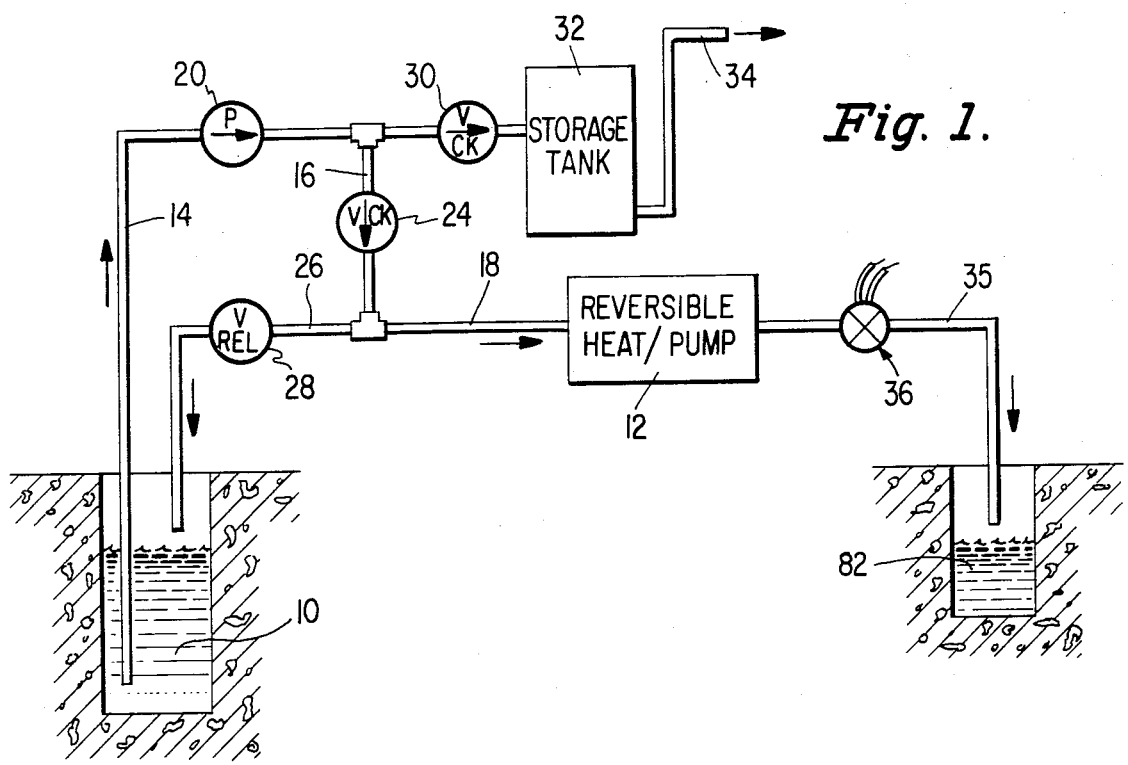
FIG. 1 is a diagrammatic illustration of a ground water supply system according to the invention for a reversible heat pump.

Referring to FIG. 1 of the drawings showing a ground water supply system in accordance with the invention, reference character 10 designates a well from which water is to be obtained for a conventional refrigerant cycling reversible heat pump 12 requiring water for heat transfer purposes. Such system as shown, includes line segments 14, 16 and 18 which taken together constitute a water supply line for the heat pump 12. Line segment 14 communicates at one end with the water in well 10 and includes a water pump 20. Line segment 16 includes a check valve 24 permitting flow in one direction only through the supply line, that is in the direction of the heat pump 12. A discharge line 26 branches off the heat pump supply line at the junction of line segments 16 and 18. The discharge line includes a pressure relief valve 28. As shown, the heat pump supply line connects at the junction of line segments 14 and 16 by way of a check valve 30 with a domestic water storage tank 32. The check valve permits the flow of water from the supply line to the tank but prevents flow in the reverse direction. The tank connects with a line 34 which serves to distribute tank contained water as required for household use. A line 35 constitutes a water discharge line for the heat pump 12.

Line 35 includes a flow control valve of conventional design for regulating the flow of water as required for proper heat pump operation and for shutting off the flow of water when heat pump operation is discontinued. The valve may, for example, be continuously controlled as in response to refrigerant pressure in the heat pump, or positioned according to whether the heat pump is operated in a heating mode, a cooling mode, or is shut down. In the description which follows, the valve is depicted as being electrically controllable according to the position of a control button 38 which is used to select the operating mode of the heat pump (see FIG. 2), and which in cooperation with a pressure switch 40 on storage tank 32 also controls the operation of water pump 20.

Figure 2:
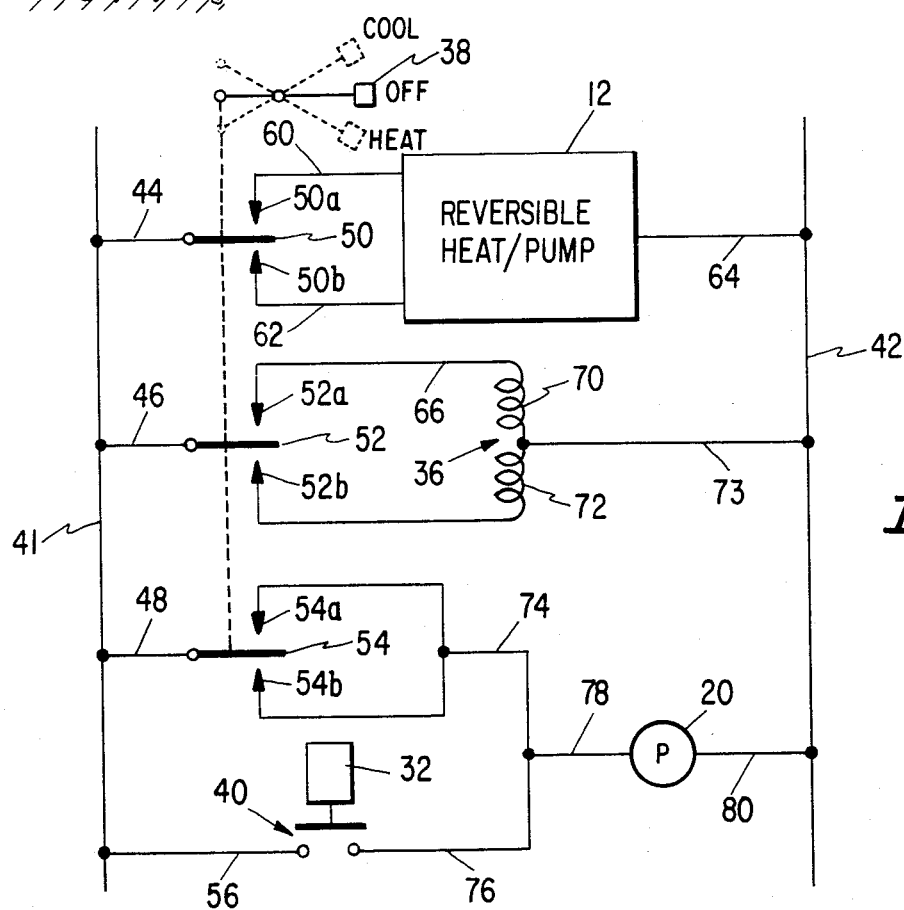
FIG. 2 is a diagrammatic illustration of control circuitry for use in connection with the system of FIG. 1.

FIG. 2 diagramatically shows circuitry for the heat pump 12, automatically water regulating valve 36, and water pump 20 between power lines 41 and 42. Such circuitry is shown as including wires 44, 46 and 48 connecting switch arms, 50, 52 and 54 respectively of the mode switch with power line 41. Another wire 56 is shown extending from line 41 to the switch 40, controllable by pressure in tank 32. Input wires 60 and 62 for the heat pump 12 extend from switch arm 50 to the heat pump, and an output wire 64 extends from the heat pump to line 42. Wires 66 and 68 extend from switch arm 52 through solenoid actuating coils 70 and 72 respectively of the automatic water regulating valve 36 to a wire 73 which connects with line 42. Wires 74 and 76 extend from switch arm 54 and switch 40 respectively to a water pump input wire 78. The water pump connects through an output wire 80 with line 42.

Control button 38 is movable between an off position, and a position calling for operation of the heat pump in a heating mode or a position calling for operation of the heat pump in the cooling mode. In the off position of the mode switch, arms 50, 52 and 54 occupy the positions shown in FIG. 2. The heat pump 12 is then deenergized. The automatic water regulating valve 36 is also deenergized and is shut off. Further, the water pump is off, except when pressure in storage tank 32 falls below a preestablished value due to domestic use of the stored water supply, in which case pressure responsive switch 40 is moved from an open to a closed position to provide for energization of the water pump.

When the control button 38 is moved from the off position into a position calling for operation of the heat pump in the heating mode, switch arm 50 is closed against contact 50a to provide for energization of the heat pump through wire 60 as required to cause the heat pump to operate as a heating unit, and switch arm 52 is closed against contact 52a to provide for the energization over wire 66 of coil 70 which causes a flow regulating member within the valve 36 to assume a position permitting water to flow at a high rate through the valve. Switch arm 54 is closed against contact 54a to provide for energization of the water pump through wires 74 and 78.

When control button 38 is moved from an off position into a position calling for operation of the heat pump in the cooling mode, switch arm 50 is closed against contact 50b to provide for energization of the heat pump through wire 62 as required for the heat pump to operate as a cooling unit, and switch arm 52 is closed against contact 52b to provide for the energization over wire 68 of coil 72 which causes the automatic water regulating valve 36 to restrict the flow of water through the heat pump. Switch arm 54 is closed against contact 54b to provide for energization of the water pump through wires 76 and 78.

While the heat pump 12 operates as a heating unit, water pump 20 delivers water from well 10 to the heat pump 12 through the heat pump supply line segments 14, 16 and 18 (FIG. 1). Water is discharged from the heat pump through line 35 including automatic water regulating valve 36, and is permitted to escape into a dry well 82 or is otherwise disposed of. As noted hereinbefore, valve 36 is operated to permit a high rate of flow through the heat pump when the heat pump is operating in a heating mode. Pressure in the heat pump supply line segments at such time is not so great as to cause pressure relief valve 28 to be opened and all of the water pumped from well 10 is delivered to the heat pump 12 except for whatever water may be required from time to time to fill the tank 32 and normalize the pressure of the domestic water supply.

When the heat pump is caused to operate in the cooling mode, and the automatic water regulating valve restricts flow through the heat pump, pressure is caused to increase in supply line segments 14, 16 and 18. However, pressure is relieved by the flow of water through check valve 30 to tank 32 while water is required to fill the tank. Pressure in the domestic water supply is prevented from becoming excessive when the tank is full by the operation of pressure relief valve 28 which opens at a predetermined pressure to permit water to escape through line 26 and be dumped back in the well as shown, or elsewhere. The flow of water on the supply side of the heat pump 12 into the tank 32 or through relief valve 28 guarantees a sufficient flow of water through the water pump as required for pump cooling and so serves to lengthen the life of the water pump.

It is to be understood that the present disclosure relates to a preferred embodiment of the invention which is for purposes of illustration only and is not to be construed as limiting the invention. Numerous alterations and modifications will suggest themselves to these skilled in the art, and all such modifications which do not depart from the spirit and scope of the invention are intended to be included within the scope of the appended claims.

I claim:

1. A water supply system for an electrically operated reversible heat pump operable in a heating mode and a cooling mode, said water supply system including a ground water supply well, a supply line connecting the supply well to the heat pump and to a water storage tank for supplying ground water to said heat pump and said storage tank, respectively, a discharge line connected to said heat pump for conducting water which has passed through said heat pump to a discharge point away from said supply well, an electrically controlled water regulating valve for controlling the flow of water through said heat pump to said discharge line so as to provide a restricted flow of water in a first operating mode of said heat pump, a relatively unrestricted flow of water through said heat pump in a second operating mode of said heat pump, and to shutoff the flow of water through said heat pump, electrically operated water pump means interposed in said supply line for conducting water under pressure to said heat pump and said storage tank, an escape line connected to said supply line between said heat pump and said water pump means for conducting water from said supply line back to said supply well, pressure relief valve means for controlling the flow of water through said escape line in accordance with the amount of restriction of water flow through said heat pump by said water regulating valve to maintain pressure in said storage tank and to return water to said supply well, and a control circuit including first switch means for energizing said heat pump in said first and second operating modes, respectively, second switch means for controlling said water regulating valve in accordance with the operating mode of said heat pump, third switch means for energizing and deenergizing said water pump means, said first, second and third switch means being operably interconnected to control said water regulating valve and said water pump means in accordance with the operating mode of said heat pump, and fourth switch means for energizing said water pump means independent of the operating mode of said heat pump to maintain a predetermined water pressure in said storage tank.

2. A ground water supply system for a reversible heat pump operable in a heating mode and a cooling mode, said system including a supply well, a ground water supply line connecting the supply well with the heat pump, a water pump for delivering ground water by way of the supply line to the heat pump for supplying ground water to exchange heat with said heat pump, a discharge line connected to the heat pump for disposing of ground water which has passed through the heat pump, a water regulating valve for controlling the flow of ground water through the supply line as required by the heat pump to provide a restricted flow of ground water through the heat pump when the heat pump is operated in a first mode, to provide a relatively unrestricted flow of ground water through the heat pump when the heat pump is operating in a second mode and to shutoff the flow of ground water through the heat pump, and a ground water escape line connected to the supply line and including a valve in the escape line operable to maintain a predetermined pressure in the supply line and to provide for the flow of ground water from the supply line into and through the escape line and directly back to the supply well without heat exchange with said heat pump when the flow of ground water through the heat pump is restricted or shutoff by operation of the regulating valve.

3. A water supply system for a reversible heat pump operable in a heating mode and a cooling mode, said water supply system including a ground water supply well, a ground water supply line connecting the supply well to the heat pump and to a water storage tank for supplying ground water to exchange heat with said heat pump and to supply ground water to said storage tank, respectively, a discharge line connected to said heat pump for conducting ground water which has passed through said heat pump to a discharge point away from said supply well, a water regulating valve for controlling the flow of ground water through said heat pump to said discharge line so as to provide a restricted flow of ground water in a first operating mode of said heat pump, a relatively unrestricted flow of ground water through said heat pump in a second operating mode of said heat pump, and to shutoff the flow of ground water through said heat pump, water pump means interposed in said supply line for conducting ground water under pressure to said heat pump and said storage tank, an escape line connected to said supply line between said heat pump and said water pump means for conducting ground water from said supply line back to said supply well without exchanging heat with said heat pump, and pressure relief valve means for controlling the flow of water through said escape line in accordance with the amount of restriction of water flow through said heat pump by said water regulating valve to maintain pressure in said storage tank and to return ground water to said supply well.

4. A ground water heat pump supply system as defined in claim 2 wherein the valve in the escape line is a pressure relief valve operable to provide for the flow of ground water into and through the escape line and to the supply well when pressure in the supply line is increased to said predetermined pressure by a restricted flow of water through the supply line.

5. A ground water heat pump supply system as defined in claim 2 including a water storage tank which is connected to the supply line between the supply well and the escape line.

6. A ground water heat pump supply system as defined in claim 5 wherein the valve in the escape line is a pressure relief valve operable to limit pressure in the water storage tank.

7. A ground water heat pump supply system as defined in claim 6 including control means for use in initiating operation of the heat pump, the water pump and the regulating valve, and means responsive to water storage tank pressure for causing the water pump to operate whenever water storage tank pressure is less than a preestablished pressure regardless of the operation of said control means.

* * * * *